Patented Nov. 8, 1927.

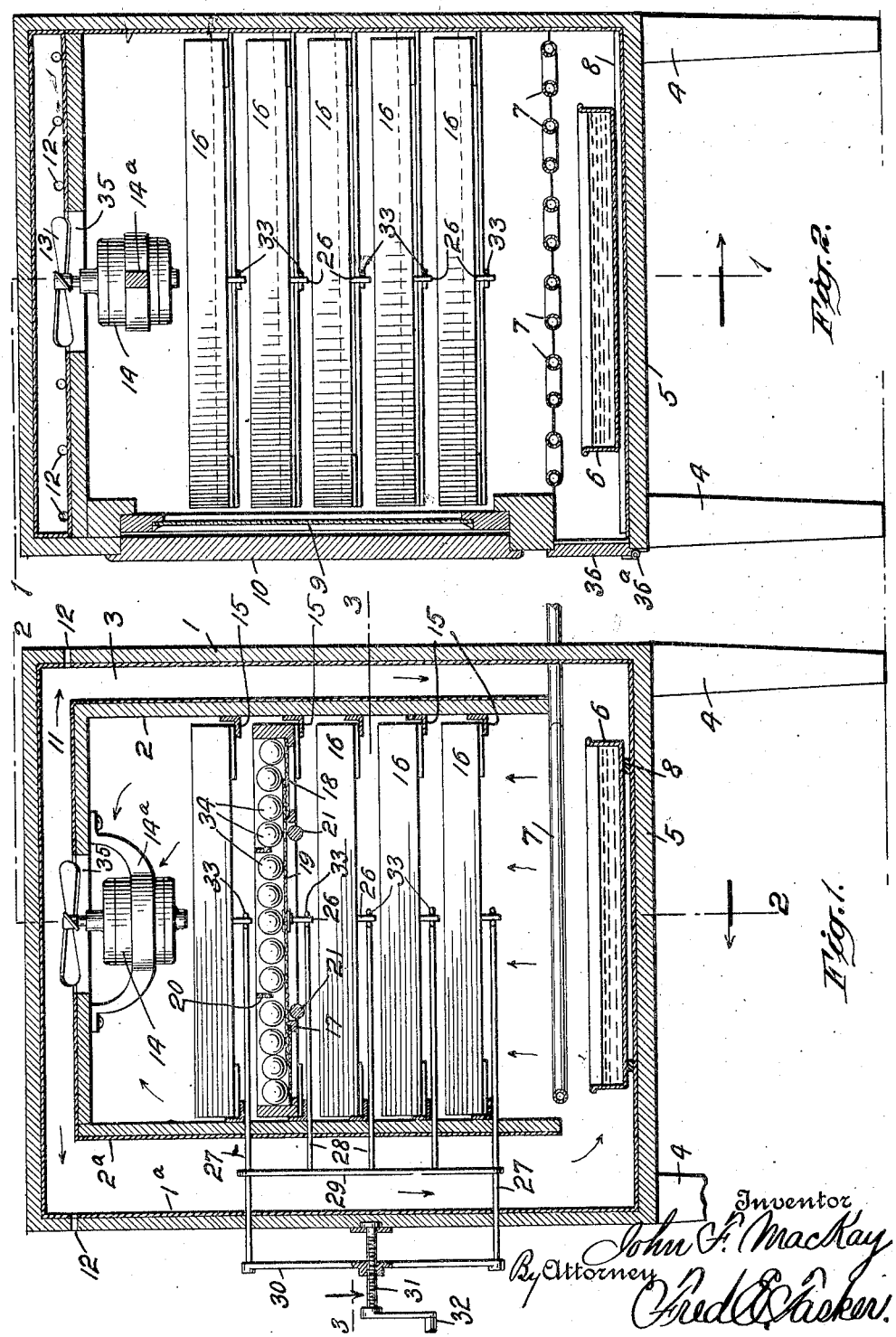

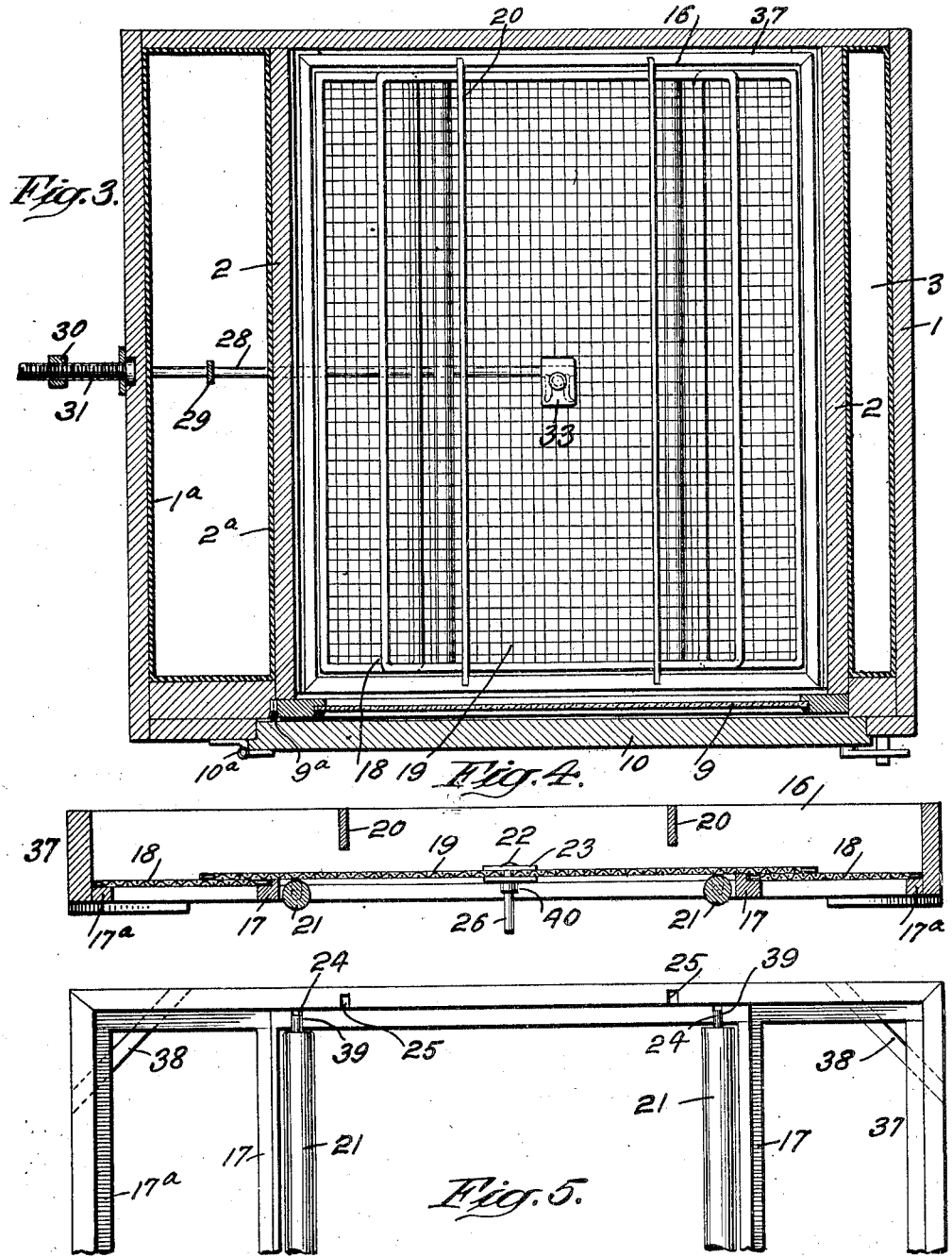

1,648,186

UNITED STATES PATENT OFFICE.

JOHN F. MACKAY, OF LANCASTER, PENNSYLVANIA.

EGG TRAY FOR INCUBATORS.

Original application filed September 21, 1921, Serial No. 502,139. Divided and this application filed October 17, 1922, Serial No. 595,180. Renewed February 2, 1927.

This invention relates to certain new and useful improvements in egg-trays for incubators for artificially hatching chicks in the chicken industry. The present application is a division of the co-pending application of MacKay and Fader for Letters Patent for incubators, filed September 21, 1921, Serial No. 502,139 which has become Patent No. 1,567,006, issued December 22, 1925. The object is to simplify and perfect the apparatus of this class, so that the same may be under more perfect control and regulation and so that the eggs may be readily turned as often as may be required, and that effective regulative adjustments may be made with facility from time to time as may be required. More particularly, I aim to provide a strong and inexpensive egg tray with simple egg-turning provisions; to provide combined and selective egg-turning operation for a plurality of trays; and to permit easy removal and replacement of a tray without derangement of the egg-turning means. These and other advantages can be conveniently realized in the construction, arrangement and combination of parts, substantially as hereinafter described and claimed.

In the accompanying drawing, illustrating the invention:

Figure 1 is a vertical section of my improved incubator, on the line 1, 1, of Figure 2.

Figure 2 is a vertical section of the same taken at right angles to the section of Figure 1, on the line 2, 2, of Figure 1.

Figure 3 is an enlarged horizontal plan view, partly in section, on the line 3, 3, of Figure 1.

Figure 4 is an enlarged cross-section of one of the egg trays.

Figure 5 is a broken plan view of the same with the bottom sections removed.

Similar characters of reference designate like parts throughout the different figures of the drawing.

As an example of structure, the incubator is seen to be supported on feet 4 and comprises an outer casing 1 and an inner casing 2, between which are side spaces 3 and a top space 11, that are in communication with each other, said side spaces also communicating at their ends with the bottom interior of the inner casing 2 at the bottom. The outer casing 1 is lined interiorly, or covered outside or in, or both, with an insulation or covering of asbestos or similar material $1^a$, so that the heat will be retained; and the inner casing 2 is similarly provided with an insulation coating or covering $2^a$. In the top of the inner casing 2 is a circular opening 35, in which is mounted a fan or blower 13, driven by an electric or other motor 14 supported by a bracket $14^a$.

The inner chamber 2 is fitted with a door 9, hinged at $9^a$, and preferably provided with glass so that the contents of the chamber may be readily inspected; and the outer chamber is provided with a door 10, hinged at $10^a$, and preferably made solid and located opposite and closely adjacent the glass door 9, so as to cover and protect the same. The lower part of the casing 1 is furnished with a door 36, hinged at $36^a$, which gives convenient access to the moisture pan 6.

Within the inner chamber or casing 2 are a plurality of egg trays 16, containing eggs, as 34. These trays 16 are arranged closely one above another, and slide easily in and out on the horizontal side ledges or cleats 15 which are secured on the inside surface of the wall of casing 2.

The trays 16 are constructed in the manner shown in detail in Figures 4 and 5. As there shown, each tray 16 has a main rectangular or square frame 37, braced at the corners by braces 38,—said frame 37 having suitable side walls connected at the bottom by horizontal rails 17 and $17^a$ which support the sections of the tray bottom, as well as end walls connecting the side walls. This bottom is usually made in three sections, two of which, as 18, are placed removably on the rails 17 and $17^a$, at the sides or ends of the tray,—the rails 17 being rebated as shown to hold said sections more firmly and keep them in place. The movable intermediate section 19 is usually larger than the others and (in its mid-position, Fig. 3) overlaps them, and slides thereon or thereover. By displacing and removing one of the sections 18, 18, an opening is left in the tray bottom. All these sections 18, 18 and 19 are preferably frames with wire gauze, wire mesh, sieve material, or other open work, so that the warm air may readily pass therethrough and come into contact with the eggs on all sides of the same. To assist the central sliding major section 19 in its movements, not only is it mounted on or above the relatively fixed minor sections 18 that extend across the tray ends from side to side of the trays, but there is inserted beneath it a pair of rollers 21, close to the rails 17,—said rollers having end journal pins 24 that loosely enter notches 39 in the sides of the tray frame 37, so that the rollers may be free to revolve as the sliding bottom 19 is moved or adjusted back and forth, and may also be freely taken out of the tray when the parts are disassembled for cleaning or other purposes. Thus all the sections 18, 18 and 19 of the bottom can be quickly and easily removed.

The movable bottom sections 19 in the trays 16 enable the eggs to be turned at proper periods, so as to expose all sides to the heat and otherwise regulate or improve the incubation. The stationary egg-supporting sections 18, 18 being comparatively narrow, relatively short cross-wise movements of the ends of the egg-supporting bottoms 19 over and off of them will turn all the eggs on both movable and stationary sections. In order to secure this turning result the better, there are obstacles or baffles against which the eggs may contact when the bottom slides; and to provide these flat partitions or bars 20 are employed, the ends of which take into small notches or openings 25 in the sides of frame 37,—from which notches 25 the partitions or cross-rods can be readily removed in disassembling the parts. These partitions 20 are preferably somewhat above the bottom section 19, as seen in Figure 4. Thus all the parts of the tray can be taken apart. The frame 37, with its baffles 20, restrains the eggs from moving bodily with the bottom 19 to any great extent, so that they are constrained to roll and turn over as it moves under them as described. As shown, the baffles 20, 20 are so located that the bottom section 19 never moves out from under the eggs between them. The movements of the bottom 19 are limited, by the ends of the frame 37, so that there is no risk of its sliding out from under the eggs when the tray is tilted after removal from the incubator.

The sliding sections 19 of the several trays 16 are operated simultaneously by connecting mechanism consisting of horizontal sliding rods 27 and 28 running through passages or supports in the casings 1 and 2, one or both. The inner ends of rods 27 and 28 are forked or hooked at 33 to loosely engage lugs formed by pins 26 on sections 19. The rods 27 may be connected together and with rods 28 by a cross-piece 29 inside of space 3, and the outside ends of rods 27 may be connected by a cross-piece 30. A screw 31 having a handle 32 passes through a nut in cross-piece 30 and has a head mounted or journaled loosely in a recess in the wall of casing 1. The revolution of the screw 31 reciprocates the rods 27 and 28 and moves the sliding sections 19 in one direction or the other so as to turn the eggs.

It will thus be clearly understood that by an easy manipulation of the screw handle 32 the movable sections 19 of the egg trays can be shifted so as to turn the eggs as may be required at intervals during the hatching operation, since the movement of the sections 19 presses the eggs against each other and against the partitions 20 and the sides of the trays, and thus causes the eggs to roll over and change their position.

It is desirable to throw some of the trays out of service at times, so far as egg turning is concerned,—inasmuch as different trays may be filled with eggs with different incubation periods. For this purpose, the operating mechanism may be selectively disconnected from any trays whose eggs are not to be turned. One way of doing this is to arrange the pins 26 with which the sliding bottoms 19 are provided so that they drop loosely into the open ended slots of the actuating hooks or claws 33 on the ends of the operating rods 27 and 28 and can be easily retracted and withdrawn from the claws and the tray bottoms 19 whenever any tray is selected to be uncoupled and taken out of service or allowed to remain a longer time without turning of its eggs. This, of course, entails no change in the vertical positions of the trays. Pins 26 have heads 22 and washers 23, and easily drop through sleeves or sockets 40 made fast in sections 19. These loose pins 26 are therefore of advantage in enabling the operator to select the trays in which the eggs are to be turned at any one time. The hooks or claws 33 usually open toward the front of the apparatus, so that when desired the trays 16 may be released and withdrawn sidewise through the front door 10 or replaced, the pins 26 easily slipping out of and into the said hooks or claws 33 without derangement of the turning mechanism.

Many changes may be made in the details of construction without exceeding the scope of the invention. The mechanism for shifting the position of the sliding tray bottom may be widely changed and substituted, and in general the embodiment of the invention may be modified as required to suit special cases within the limits of the claims.

Having thus described the invention, what is claimed as new and desired to be secured by Letters Patent, is:

1. In an incubator, a series of egg trays, each comprising a frame and bottom sections, some of the latter being fixed and one relatively movable, in combination with means for moving the latter, consisting of a series of rods connected together, and removable means for engaging said rods with the movable sections and disengaging them individually therefrom so as to cut out one or more sections when desired.

2. In an incubator, a series of egg trays, each comprising a frame and bottom sections, some of the latter being fixed and one relatively movable, in combination with means for moving the latter, consisting of a plurality of connected rods and a common screw device for said rods, together with a removable loose pin on each movable section for connecting said section with one of the rods and enabling said section to be disconnected from its rod when desired.

3. In an incubator, a series of egg trays consisting of a frame and a bottom comprising fixed sections and a relatively sliding section, rollers supporting the latter and cross partitions against which the eggs contact in turning, together with means for actuating the sliding bottom sections of one or more trays, and means on each sliding section for selectively cutting out of service the tray to which said section belongs, said means consisting of a removable device loosely engaging an opening in the mechanism for actuating the sliding sections.

4. In an incubator, a series of egg trays consisting of a frame and a bottom comprising fixed sections and a relatively sliding section, removable rollers having loose end journals supporting the said sliding section, transverse removable partitions held in notches in the sides of the frame against which the eggs contact in turning, together with means for actuating the sliding bottom sections of one or more trays, and means on each tray for selectively cutting said tray out of service, consisting of a removable pin on the sliding section of the tray loosely engaging an opening in the means for actuating the sliding sections.

5. In an incubator, a series of egg trays consisting of a frame and a bottom having fixed sections and a relatively sliding section, removable rollers supporting the sliding section, obstacles carried by the sides of the tray frames against which the eggs contact in turning, and means connecting with a greater or less number of the said trays for jointly actuating the sliding sections, and means on each tray for selectively cutting said tray out of service, consisting of a removable pin on the sliding section of the tray loosely engaging an opening in the means for actuating the sliding sections.

6. In an incubator, a series of egg trays consisting of a frame and a bottom having fixed sections and a relatively sliding section, removable rollers supporting the sliding section, obstacles carried by the sides of the tray frames against which the eggs contact in turning, and means connecting with a greater or less number of the said trays for jointly actuating the sliding sections, said means consisting of rods having openings in their inner ends, together with removable pins on the sliding sections which engage in said openings.

7. An incubator egg-tray including an egg-restraining frame, and means for turning eggs therein comprising egg-supporting bottom sections one movable back and forth over and off of another.

8. An incubator egg-tray including an egg-restraining frame, and means for turning eggs therein comprising major and minor egg-supporting bottom sections, the former movable back and forth over the latter so as to turn the eggs on both by comparatively short movements.

9. An incubator egg tray including an egg-restraining frame, and means for turning eggs therein comprising egg-supporting bottom sections carried thereby, one displaceable leaving a bottom opening, and another movable back and forth over and off of the first when in place.

10. An incubator egg-tray including a frame with side and end walls and transverse egg-baffles, and a bottom for supporting the eggs between said baffles sliding back and forth from end to end in the frame beneath them and limited in its movements by the frame ends, thus turning all such eggs concurrently by its movement.

11. An incubator egg-tray having a frame and a bottom comprising egg-supporting sections removably mounted therein, one movable back and forth over and off of another, and egg baffles above said bottom sections removably mounted on the frame.

12. An incubator egg tray having egg baffles and a bottom comprising major and minor egg supporting sections, the minor extending across the end of the tray and the major being movable back and forth beneath the baffles in egg-turning movements in which its end portion moves back and forth across the minor section, so as to turn all the eggs on both sections by comparatively short movements.

13. In an incubator, an egg tray having a sectional bottom, egg baffles, and means for moving the major portion of said bottom back and forth over minor end portions, whereby to turn eggs supported on all of said bottom portions.

14. In an incubator, in combination, an egg tray, a sectional egg-supporting bottom in said tray, egg baffles, said bottom comprising a stationary section at each end reaching from side to side of the tray and a movable intermediate section reaching from side to side of the tray and adapted to be moved back and forth therein so that when moving in either direction one end of the intermediate section will be advanced over one end section and the opposite end will be drawn from the other end section, whereby all the eggs will be turned by a comparatively short movement of the intermediate bottom section, and means for so moving said intermediate bottom section.

15. A tray of the character described comprising a main frame, a screen covered bottom frame slidably mounted in the main frame and forming an egg support, and removable end sections carried by the main frame and also forming bottom sections for the main frame.

16. A tray of the character described comprising a main frame, a screen covered bottom frame slidably mounted in the main frame and forming an egg support, removable end sections carried by the main frame and also forming bottom sections for the main frame, and means for imparting a reciprocal movement to the screen covered bottom frame within the main frame.

17. A tray of the character described comprising a main frame, a screen covered bottom frame slidably mounted in the main frame and forming an egg support, removable end sections carried by the main frame and also forming bottom sections for the main frame, and removable cross-rods disposed above the screen covered bottom frame and carried by the main frame.

18. A tray of the character described comprising a main frame, a screen covered bottom frame slidably mounted in the main frame and forming an egg support, removable end sections carried by the main frame and also forming bottom sections for the main frame, removable cross-rods disposed above the screen covered bottom frame and carried by the main frame, and means for imparting a reciprocal movement to the screen covered bottom frame.

19. A tray of the character described comprising a main frame, a pair of normally stationary but removable bottom end sections therefor, a screen frame covering the remaining bottom portion of the main frame, means permitting sliding movement of the screen frame with relation to the removable end bottom sections, and means for manually imparting sliding movement to the screen frame.

20. A tray of the character described comprising a main frame, a pair of normally stationary but removable bottom end sections therefor, a screen frame covering the remaining bottom portion of the main frame, means permitting sliding movement of the screen frame with relation to the removable end bottom sections, means for manually imparting sliding movement to the screen frame, said means comprising a manually-actuated sliding member, and a lug on the screen frame engaged thereby.

In testimony whereof I hereunto affix my signature.

JOHN F. MacKAY.